Dec. 12, 1950 W. C. EDWARDS 2,533,234

TELEPHONE ANSWERING APPARATUS

Filed Dec. 27, 1947 6 Sheets-Sheet 1

Inventor
WILLIAM C. EDWARDS

By Lyon & Lyon
Attorneys

Dec. 12, 1950 W. C. EDWARDS 2,533,234

TELEPHONE ANSWERING APPARATUS

Filed Dec. 27, 1947 6 Sheets-Sheet 2

Inventor
WILLIAM C. EDWARDS

By Lyon & Lyon
Attorneys

Dec. 12, 1950 W. C. EDWARDS 2,533,234

TELEPHONE ANSWERING APPARATUS

Filed Dec. 27, 1947 6 Sheets-Sheet 3

Inventor
WILLIAM C. EDWARDS

By Lyon & Lyon
Attorneys

TELEPHONE ANSWERING APPARATUS

Filed Dec. 27, 1947 6 Sheets-Sheet 4

Inventor
WILLIAM C. EDWARDS

By Lyon & Lyon

Attorneys

TELEPHONE ANSWERING APPARATUS

Inventor
WILLIAM C. EDWARDS

By Lyon & Lyon
Attorneys

TELEPHONE ANSWERING APPARATUS

Filed Dec. 27, 1947 6 Sheets-Sheet 6

Inventor
WILLIAM C. EDWARDS

By Lyon & Lyon
Attorneys

Patented Dec. 12, 1950 2,533,234

UNITED STATES PATENT OFFICE 2,533,234

TELEPHONE ANSWERING APPARATUS

William C. Edwards, Jamaica, N. Y., assignor of one-half to J. Cheever Condin, Bel Air, Calif., Preston Davie, Westbury, and Charles D. Prutzman, Forest Hills, N. Y., and seven and one-half per cent to J. M. W. Miller, Los Angeles, Calif.

Application December 27, 1947, Serial No. 794,174

20 Claims. (Cl. 179—6)

This invention relates to an apparatus for automatically answering a telephone and for transmitting and recording messages.

It is the general object of the present invention to simplify, improve and render more economical an apparatus by which messages recorded at a receiving station may be automatically transmitted over a telephone line in answer to a call, and by which messages received at the station from over a telephone line may be automatically recorded.

Another object of the present invention is to provide an apparatus which is constructed independently of the telephone system and requires only the placing of the usual French dial phone in a unit of the apparatus to perform its intended functions, whereby all electric connections and physical attachments of the telephone line apparatus is avoided.

A further object of the present invention is to provide an apparatus which is adapted to be set in operation by circuits responsive to the reception of audio signal from the usual bell of the telephone, which apparatus is shielded to prevent response from extraneous noises.

A further object of the present invention is to provide an apparatus responsive to the ringing of the bell of the usual telephone system for automatically lifting a telephone receiver to allow for reception and transmission of messages, which apparatus is maintained in operative condition in response to a call from the telephone system by circuits controlled purely by audio frequencies, whereby the apparatus will be promptly shut off at the end of its transmission and reception of messages, and thus not place the telephone line out of operative condition for any substantially unused period of time.

By the apparatus of the present invention, after reception of the calls from the telephone line, the telephone receiver is lifted into operative position by means controlled electrically and in response to the continued reception of audio signals so that promptly upon the completion of any message transmitted to the apparatus, the apparatus will be shut off and the telephone receiver returned to its off position.

Another object of the present invention is to provide a telephone answering system which is capable of recording messages of various desired duration and which is not dependent upon any time period for its performance, being capable of recording long or short messages and of promptly automatically moving into an inoperative or off position after the completion of either a long or short message.

A further object of the present invention is to provide an apparatus capable of responding to secret sound signals which may be received from the telephone line for repeating previously recorded calls.

More particularly, it is an object of the present invention to provide an apparatus responsive to a beat frequency which may be generated in the apparatus by the reception of specific combinations of audio frequencies to condition the apparatus for playing back over the telephone lines messages previously recorded by the apparatus.

Further objects of the present invention are to provide a telephone-answering system with means by which an announcement period of variable length may be recorded in the apparatus and transmitted by the apparatus in response to a call, the apparatus being automatically conditioned for reception of messages of varying length.

Further objects of the present invention are to provide new, improved and simplified means of controlling the movement of recording arms and cutting arms.

The apparatus of the present invention, together with various additional objects and advantages of the invention, will be more fully understood from the following description of a preferred form or example of the apparatus embodying the invention. For this purpose I have hereafter described the preferred forms of the invention in connection with the accompanying drawings in which:

Figure 23 is an electrical diagram of the apparatus.

Figure 1:
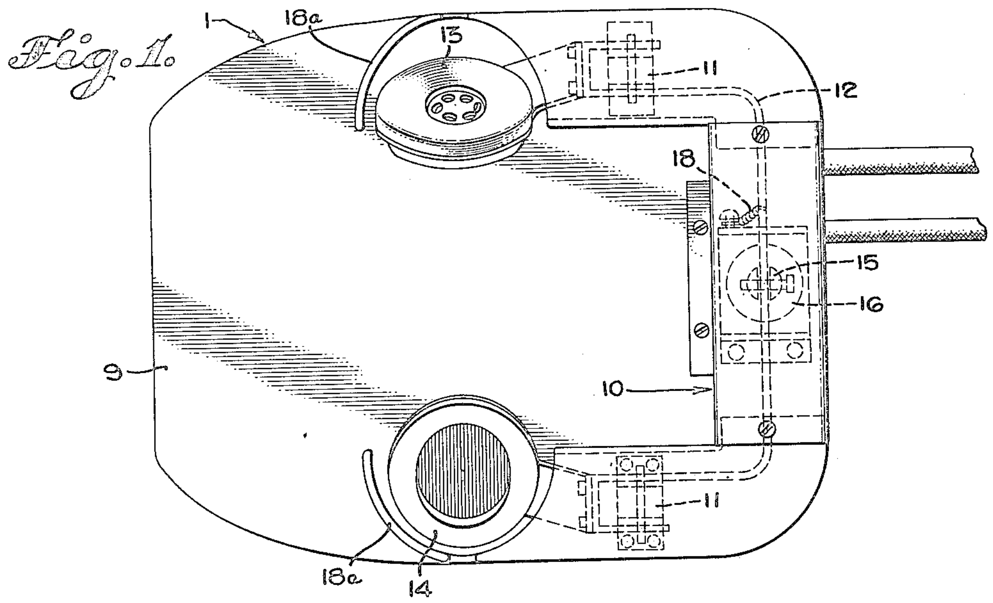
Figure 1 is a plan view of the telephone lift unit.
Figure 2:
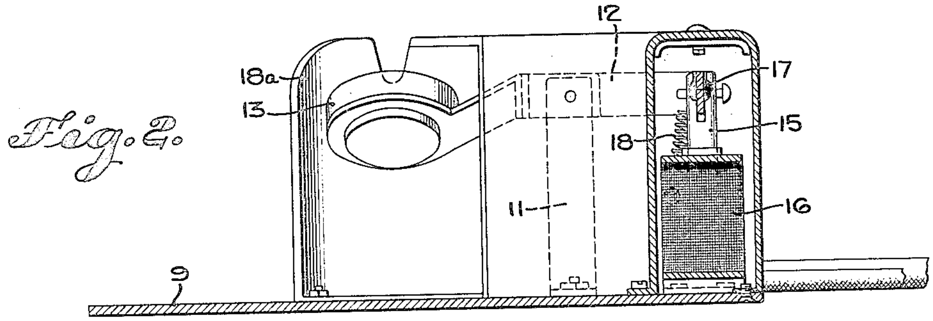
Figure 2 is an elevation partly in section.
Figure 3:
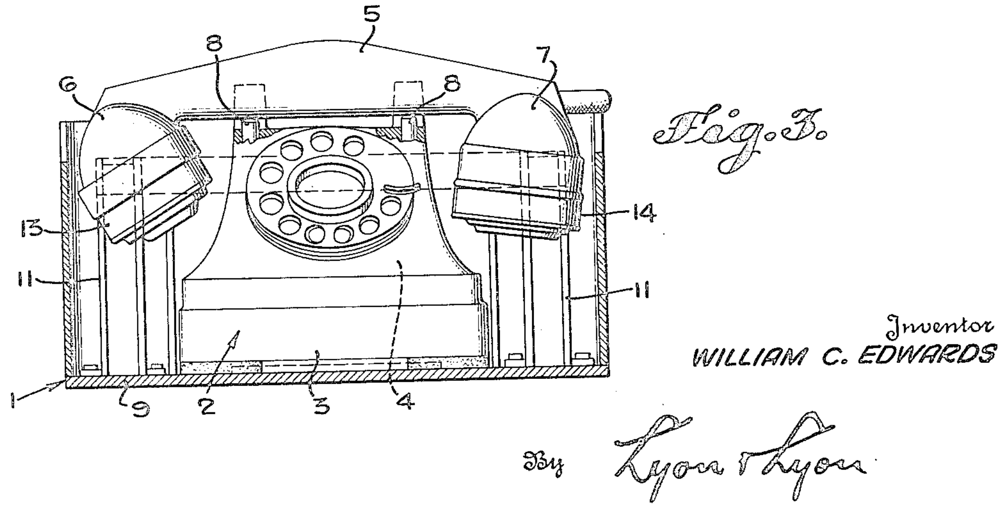
Figure 3 is an end view partly in section, with the ordinary hand-set in place in the telephone unit.

Referring first to Figures 1 to 3 of the drawings, the apparatus includes a telephone lift unit 1 into which the ordinary French type telephone 2 is adapted to be set, the setting of this French type teelphone receiver 2 in the telephone lift unit 1 being the only required connection between the apparatus of the present invention and the telephone system. The ordinary French type dial phone consists of a base 3 in which is housed a bell 4, which rings at the initiation of a telephone call at the station. Such a telephone also includes a hand set including a handle 5 having at its opposite ends a receiver 6 and microphone 7, the receiver 6 being intended to produce audio tones in response to audio signals sent over the telephone lines and the microphone 7 being intended for creating audio frequencies in response to sound vibrations received thereby. In such ordinary French type telephone receiver the arm 5 is intended to rest over plungers 8, which actuates switches (not shown) for shutting off the telephone lines when the handle and its receiver and microphone 7 are rested in position on the base 3.

The telephone lift unit of the present invention comprises a base plate 9 upon which the telephone receiver 2 is adapted to be set. At the rear the unit is provided with a generally U-shaped housing 10 which serves as a guide and a stop for guiding the telephone unit 2 into proper alignment. Within the sides of the housing 10 are positioned mounting posts 11, which pivotally support the U-shaped member 12. To the opposite ends of the U-shaped member 12 are attached a microphone 13 and a receiver 14, generally physically shaped to align respectively with the receiver and microphone 7 of the telephone receiver 2 so that with the telephone receiver 2 in the unit 1 the receiver 6 is adapted to sound into the microphone 13 of the unit 1 while the microphone 7 is adapted to pick up sound from the receiver 14 of the unit 1. At the rear of the housing the center of the arm 12 is pivoted to the bifurcated end of a plunger 15 of a solenoid 16, the pivot including a resilient bushing 17. A spring 18 is provided for normally overcoming the weight of the receiver and microphone 13 and 14, and pivoting these upwardly. When the telephone arm 5 is placed in position, however, the weight of this arm is sufficient to overcome the force of the spring 18 and pivot the arm 12 so that the telephone arm 5 will actuate the plungers 8 to shut off the phone until solenoid 16 is energized. The ends of the outer walls of the housing 10, as indicated at 18*a*, are curved around the receivers and microphones to form a shield and baffle. These shields and baffles 18*a* serve the function of directing the sound of the bell to the microphone 13, and also serve to shield the microphones from picking up extraneous noises, so that the apparatus will only be turned on by the ringing of the phone bell.

Figures 4, 5:
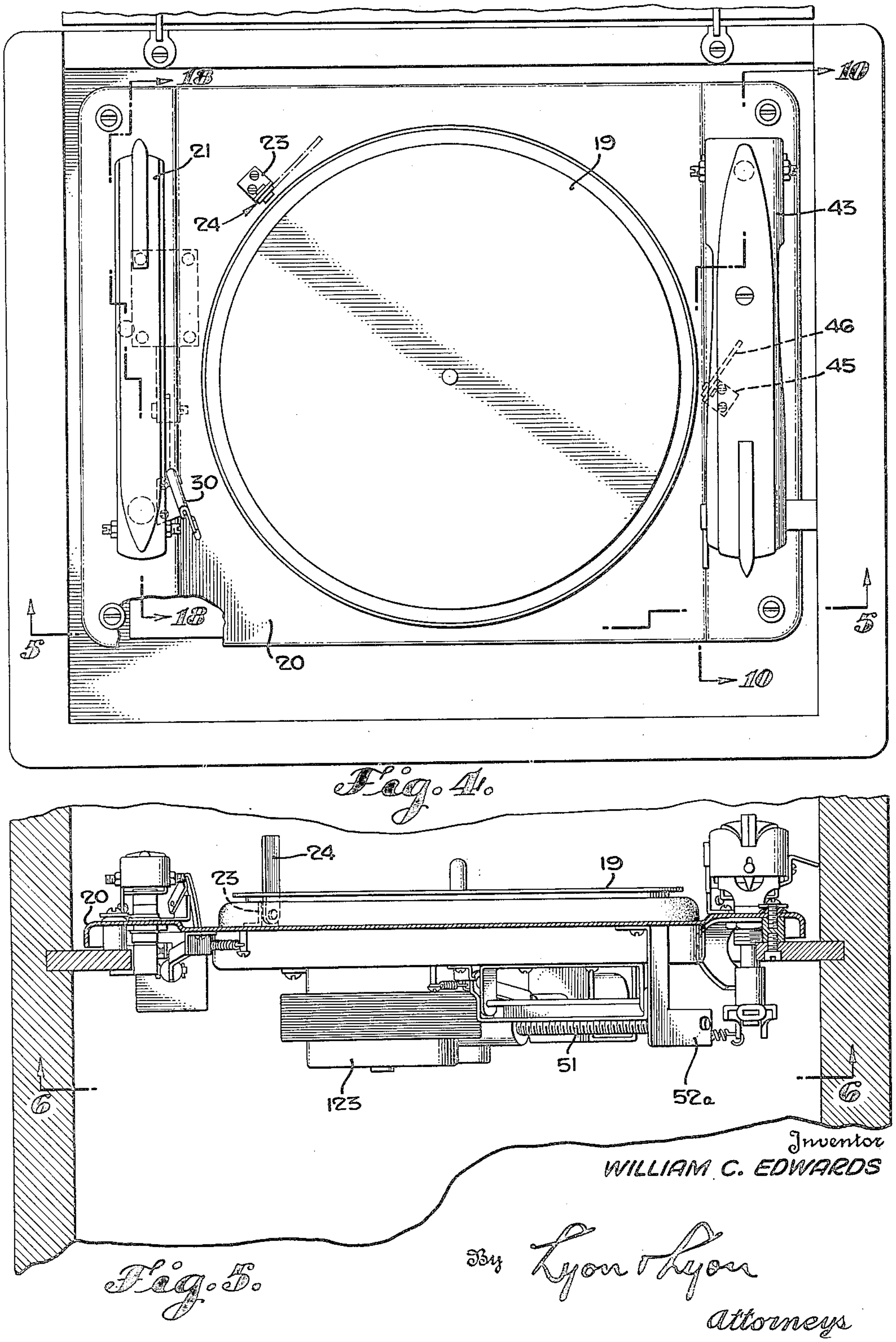
Figure 4 is a plan view of the recording and play-back apparatus.
Figure 5 is an elevation in section on the line 5—5 of Figure 4.
Figure 6:
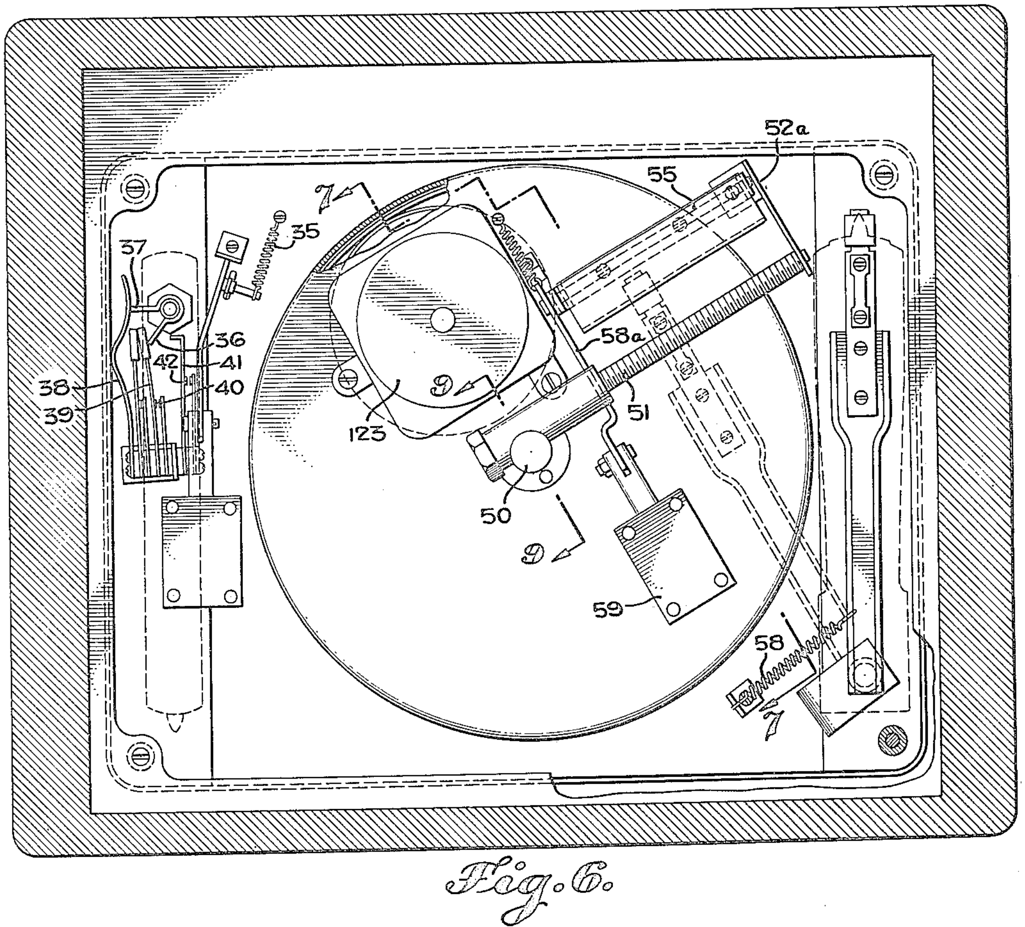
Figure 6 is a bottom view taken on the lines 6—6 of Figure 5.
Figure 7:
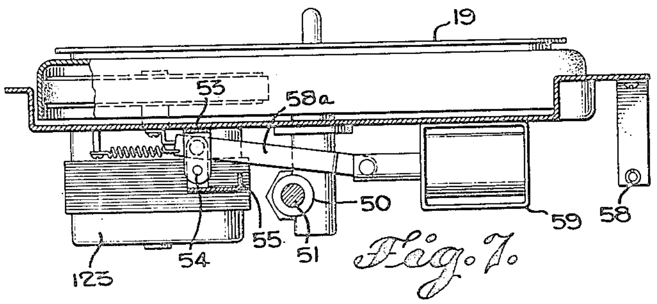
Figure 7 is a section on the line 7—7 of Figure 6.
Figure 9:
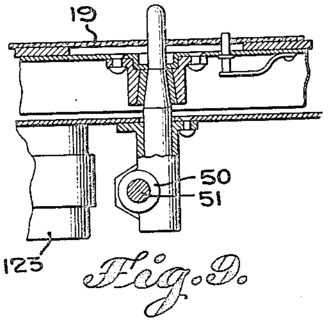
Figure 9 is the section on the line 9—9 of Figure 6.
Figure 8:
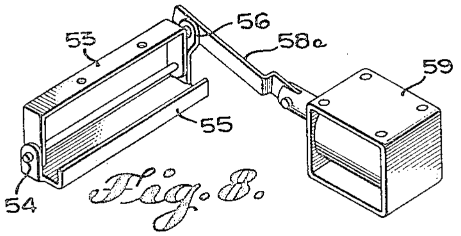
Figure 8 is a perspective view of the lift mechanism for the recording arm.
Figure 10:
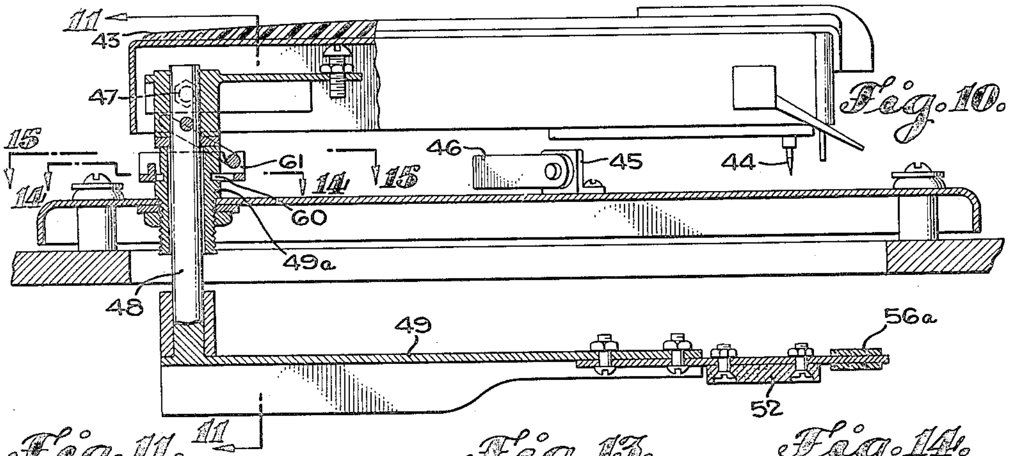
Figure 10 is a section on the line 10—10 of Figure 4.
Figures 11, 12:
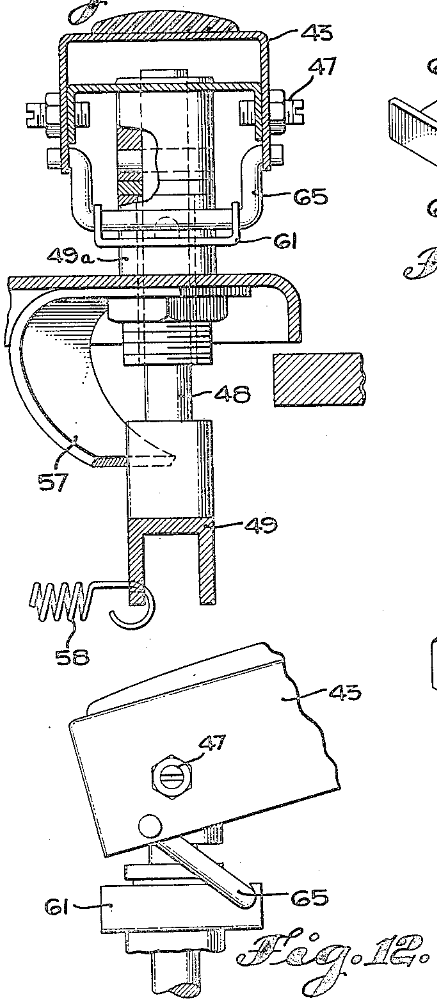
Figure 11 is a section on the line 11—11 of Figure 10.
Figure 12 is a fragmentary view of the pivotal mounting for the recording arm.
Figure 13:
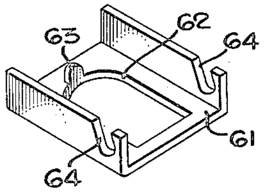
Figure 13 is a perspective view of a lift member employed in the mounting of Figure 12.
Figure 14:
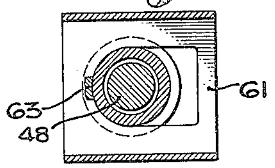
Figure 14 is a section on the line 14—14 of Figure 12.
Figure 15:
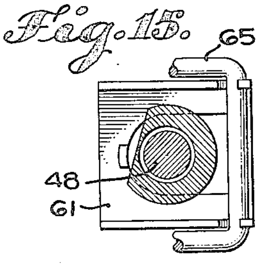
Figure 15 is a section on the line 15—15 of Figure 10.
Figure 16:
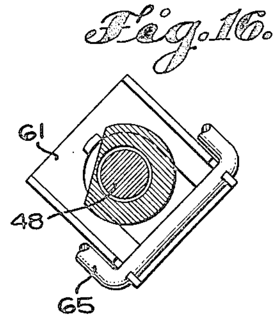
Figure 16 is a similar section in a slightly different position.
Figure 17:
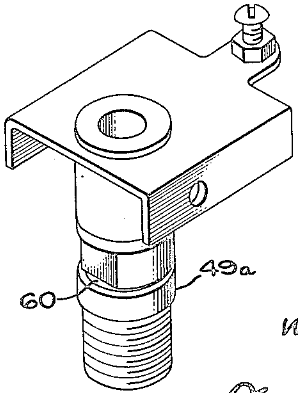
Figure 17 is a perspective view of certain of the reproducer head mounting elements.
Figure 18:
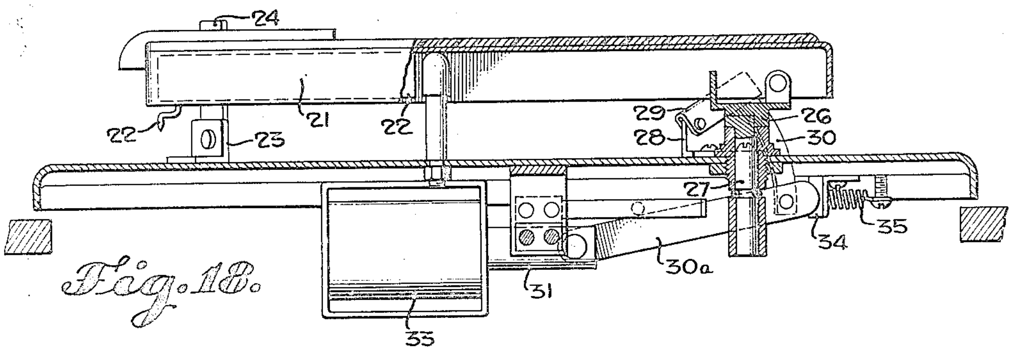
Figure 18 is a section on the line 18—18 of Figure 4.
Figures 21, 22:
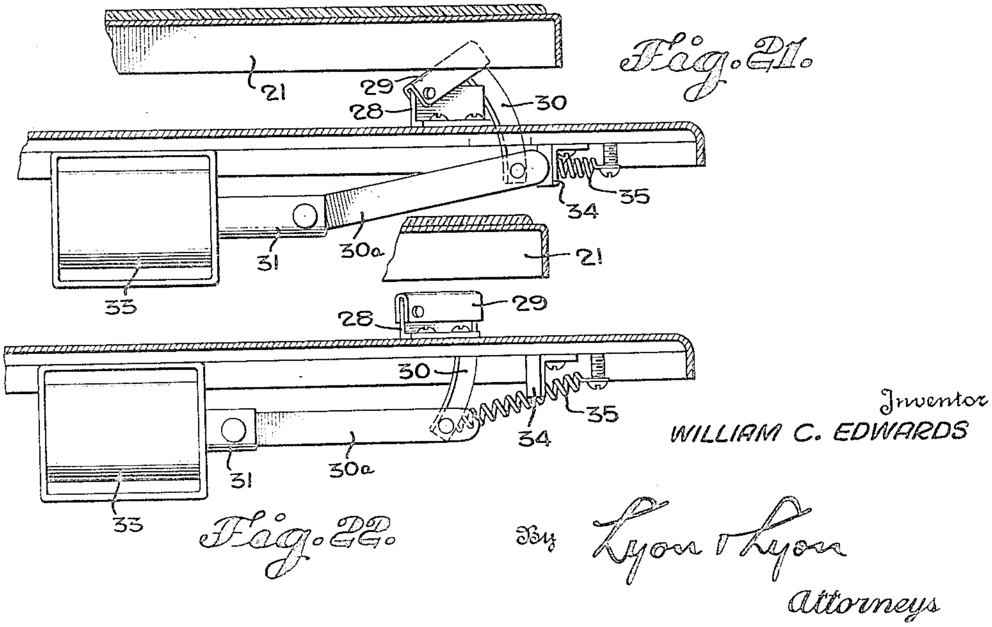
Figure 21 is a diagrammatical view of the mechanism for raising the reproducer arm in the raised position.
Figure 22 is a similar view in the lowered position.
Figure 2B:
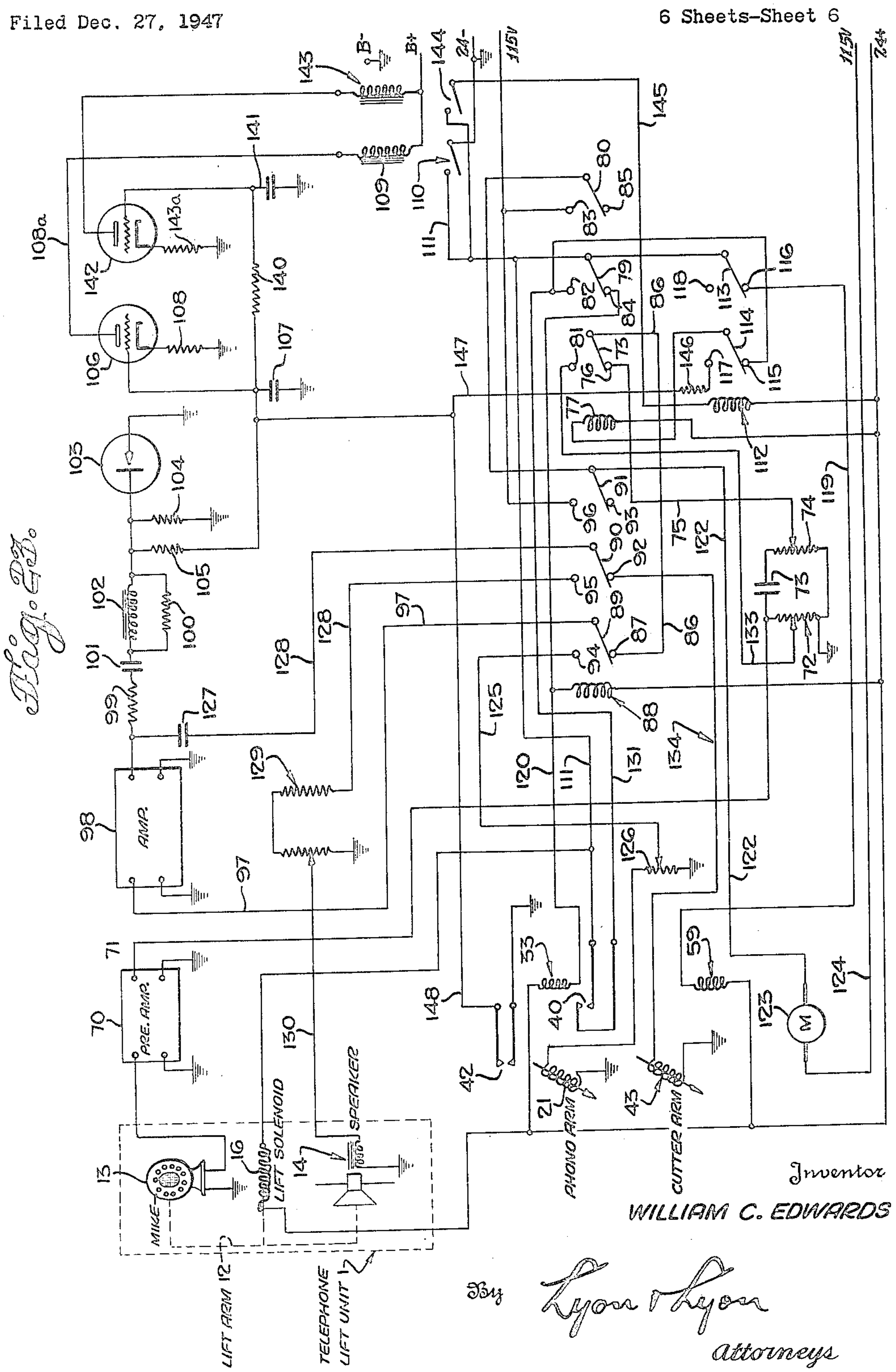

Now referring to Figures 4 to 22 of the drawings, the apparatus includes a turntable 19 which rotates above a base plate 20, which is intended to operate with a disk record thereon. For playing back the recordings on the disk record rotated by the turntable there is provided an arm 21 having a pickup head and stylus 22. On the base 20 there is mounted a bracket 23, to which is pivoted a stop arm 24, which when turned up will stop the motion of the arm in a counterclockwise direction so as to align the stylus of the arm with the edge of the recording on the disk. The arm 24 may be turned down to move the arm to the dotted position shown in Figure 4 where arm 21 is off the record, or to allow playing or over-sized records. The arm 21 is pivotally mounted as indicated at 26 on a shaft 27. On the base plate there is provided a bracket 28, to which is pivoted a movable slide 29. This slide is positioned to move to a comparatively horizontal position (Figure 22) in which the arm 21 may move over the record on the turntable 19 to a more inclined position (Figure 21) in which it will cause the arm 21 to move counterclockwise against the stop 24. The slide 29 has an arm 30 which passes through an opening in the base 20, and below the base the arm is pivoted to a link 30*a*, the other end of which is pivoted to the plunger 31 of a solenoid 33, by which the pivoting of the slide 29 is controlled. A bracket 34 is provided for limiting the upward pivoting of the slide 29 and a spring 35 is shown for normally urging the linage into the position where the slide 29 is tilted.

The shaft 27 which rotates with the arm 21 is provided below the base plate with fingers 36 and 37. Finger 37 engages a spring arm 38 while finger 36 is adapted to in the position shown in Figure 6 engage an arm 39 to separate contacts 40. In a further rotated position of the arm 36 it is adapted to engage the arm 41 to close the contacts 42. The first set of contacts 40 are designed to be closed after the play back arm 21 has passed over the announcement period of the message recorded on the records as hereafter described, whereas the contacts 42 are adapted to be closed by the arm when it reaches the inner end of its movement over the record. The spring 38 is shaped so as to apply a gradually increasing pressure against the finger 37 so as to progressively assist the record arm 21 to move toward the center of the record.

There is also provided a recording stylus arm 43 having therein a head responsive to sound frequencies for moving a cutting point 44 in order to record the disk record on turntable 9. On the base plate there is mounted a bracket 45 having the pivot stop arm 46 which will stop the motion of the cutter arm 43 in position to properly place that arm in initial position for recording on the record past the announcement section on the record. The pivot stop 46 is lowerable for recording when desired to be effected on extra large records.

Figures 19, 20:
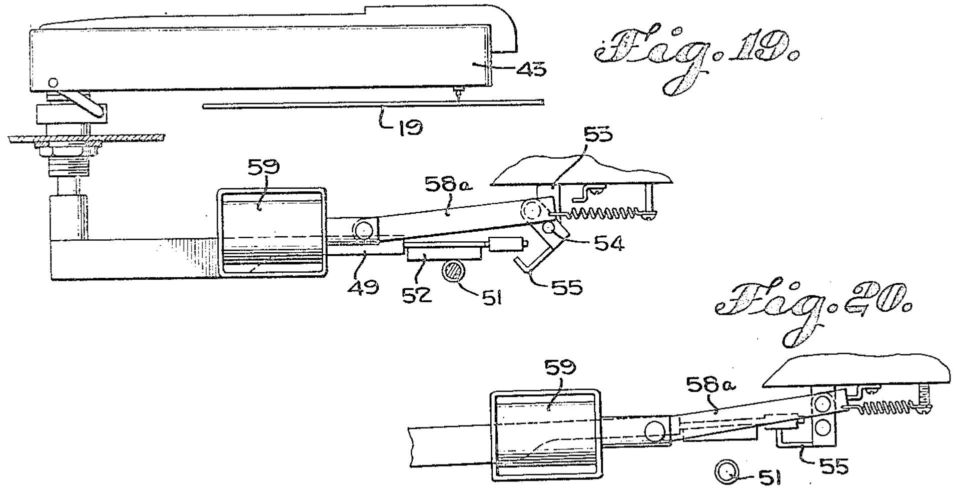
Figure 19 is a somewhat diagrammatical view of the lift mechanism for the recording arm.
Figure 20 is another diagrammatical view of the mechanism of Figure 19 showing the apparatus in the raised position.

This recording arm 43 is pivoted as indicated at 47 to a shaft 48, which passes somewhat loosely through a bushing $49^a$ mounted by the base 20 and below the base is attached to an arm 49. While the recording arm 43 is pivoted to the shaft so that it may be manually moved upward for replacing the cutting point, it is attached to radially rotate with the rotations of the shaft 48. The turntable 19 has a worm drive 50 with a feed screw 51 adapted to be engaged by a pad 52 carried by the arm 49, by means of which the recording arm 43 is actuated. The feed screw 51 is mounted by a bracket 52a depending from the base plate 20. There is also mounted a bracket 53 on the base plate, to which is pivoted, as indicated at 54, a lift member 55 to which is attached the arm 56. The lift member 55 is adapted on rotation in position shown in Figure 19 to contact the end of the arm 49, thereby to pivot that arm upwardly in order to pivot the recording arm 43 upwardly. By these means the pad 52, carried by the arm 49, is likewise raised above the feed screw 51, as indicated in Figure 20, so as to disconnect the arm 49, with the recording arm 43, from the feeding screw, so that it may be radially manually lifted. The pivoting of arms 49 and 43 by the lift member 55 occurs through the looseness of the shaft 48 in the bearings 49a. An elastic cushion 56a is placed on the end of the arm 49 to be contacted by the lift member 55. In order that the arm 49a shall have a firm pivot in operations, there is provided a guide member 57, against which the shaft 48 is yieldingly pressed by a spring 58 anchored to the base at one end and attached to the arm 49 at its other end.

The lift 55 has its arm 56 pivoted by a link 58a to a solenoid 59, which when energized will cause the arm to be lowered. By this method of mounting the recording arm 43, when that arm is lifted by the lift 55 to disengage it from the record and the feed screw 51, it is advanced slightly radially inwardly into the flexing of the elastic cushion 56a and its reaction against the spring 58, so that when the arm 43 is again lowered, it will clear any previously recorded message and allow a slight spacing between recorded messages. The bushing 49a has a circumferential slot 60 by which a plate 61 is mounted on the bushing, the plate 61 having an opening 62 enlarged at one end to fit in the slot 60, a stop 63 being provided to contact the bushing 49a. The plate has upturned edges having recesses 64 to engage the ends of a link 65. This link 65 is pivotally connected to the recording arm 43. When 43 is manually lifted, a moment is imparted through link 65 to cause sufficient lifting of the shaft 48 so as to disengage the feed screw 51 from the arm 49, thereby allowing the recording arm 43 to be advanced over the record as desired.

The operation of the apparatus will be described in conneticon with the electrical diagram in Figure 23. In use of the apparatus there is recorded on the outer edge of a disk record an announcement such as, for example: "This is an automatic secretary answering. Kindly leave your name, address and telephone number, and any message you wish to leave." Such a record is placed on the turntable 19 and the play-back arm 21 moved over the record and against the stop 24, at which time the needle will be held above the edge of the announcement recording on the record, and will be held in this position by the inclined slide 29, which is now in the inclined position so as to prevent the arm moving across the record. Likewise, the cutter arm 43 is moved against its stop 46, which positions it to begin recording on the record after it is lowered into contact with the record, the cutting point of the recording arm being at a point in advance of the announcement recording on the record. In this position, with electrical apparatus hereafter described turned on, the apparatus is in position to answer telephone calls.

When the bell of the telephone system rings this sound is picked up by the microphone 13 which is connected to a preamplifier 70. The output of the preamplifier is connected by the line 71 to a potentiometer 72 and through a condenser 73 to potentiometer 74. The condenser 73 is designed to offer a high reactance to the lower part of the audio frequency range so that only the higher frequency, such as corresponds to the bell note, will materially energize the potentiometer 74. This condenser therefore assists in blocking extraneous noises when turning on the apparatus.

From the potentiometer 74 the signal is taken from an adjustable tap to line 75, which leads to a normally closed contact 76 of a relay. This relay includes the solenoid 77, which is adapted when energized for simultaneous moving three switch arms 78, 79 and 80, from the position shown in the figure upwardly to make contact with contacts 81, 82, and 83, switch arms 79 and 80 normally making contacts with contacts 84 and 85. At this period of operation solenoid 77 is not energized, so that the audio signal passes through line 86 which leads to a contact 87 of a second relay. This second relay includes the solenoid 88 which simultaneously moves the three switch arms, 89, 90 and 91, from the position shown where they are contacting respectively contacts 87, 92 and 93 into position to engage the contacts 94, 95 and 96. At this period of operation solenoid 88 is not energized and hence the audio signal is applied to line 97 leading to the amplifier 98. The output from the amplifier 98 is passed through a resistor 99 and through a filter circuit which includes the resistance 100, condenser 101 and inductance 102. The values of this filter circuit are selected so that it will be in resonance with a particular frequency for purposes hereafter described.

This resonant frequency is outside of the ordinary audio range of the telephone system so that the audio notes now being transmitted do not correspond to the resonance frequency of this filter system; sufficient signal, however, passes through this filter network to turn on the apparatus as hereafter described. From the filter the signal is applied to the rectifier 103 and to the resister 104 to the ground. By this means an audio frequency bias is placed on the rectifier 103 which passes rectified currents through resister 105 to a tube 106. These signals also serve to charge the condenser 107. The resister 105 and condenser 107 have value selected to operate as a time constant circuit applying a positive bias to tube 106 after a suitable charging period such, for example, as two seconds. Suitable values for the resister 105 and the condenser 107 are, for example, one half of a megohm and four microfarads respectively. In the absence of the reception of the bias from the rectifier tube 103, tube 106 is biased by its cathode resister 108 so that the tube will draw very little current. When it is positively biased as described, then substantial current flows from the line 108a to solenoid 109. This causes solenoid 109 to close its contacts 110.

The closing of contact 110 grounds line 111. In the apparatus there is provided a D. C. potential, the negative side of which is grounded and the positive side of which is connected to the solenoids of relays 77, 78, 112, and to solenoids 16, 33 and 59. Thus solenoid 16 is energized. This solenoid is located, as previously described, in the telephone lift unit 1, and accordingly operates to lift the telephone arm 5 to position its receiver 6 and microphone 7 into operative condition. Plungers 8 of the ordinary telephone operate the usual switch to bring the telephone receiver and microphone into connection with the telephone lines.

The ground line 111 leads to a switch arm 113, which is one of two switch arms 113 and 144 of a relay, which includes the actuating solenoid 112 and the normally closed contacts 115 and 116. When the solenoid 112 is energized the switch arms 113 and 114 are transferred from the position shown to make contacts 117 and 118. At this period of operation solenoid 112 is not energized so a ground connection is made through line 119 to energize the solenoid 59 as previously described. The energizing of solenoid 59 lowers the recording arm 43 into contact with the record in position to record messages.

The ground line 111 also connects through contact 84 now closed to line 120, which energizes solenoid 33 and solenoid 88. The solenoid 33, as previously described, when energized lowers the phonograph pick-up arm 21 into contact with the record. By this operation the play-back stylus comes into contact with the start of the announcement recorded on the record. Energizing solenoid 88 moves the arm 91 into position to make contact with the contact 96, thereby connecting line 122 to motor 123, which is connected to line 124. Lines 122 and 124 constitute a potential source for energizing the motor 123. Motor 123 is connected by means not shown for rotating the turntable 19 of the apparatus. Likewise, the energizing of solenoid 88 transfers the intake line 97 of the amplifier 98 from preamplifier 70 to line 125 leading to a potentiometer 126 connected to the phonograph pick-up arm 21. Likewise, the energizing of solenoid 88 connects an output from the amplifier 98 through condenser 127 to line 128 through arm 90 and contact 95 to a potentiometer 129, from which leads line 130 to the receiver 14 of the telephone unit.

It will thus be seen that the apparatus includes a means (including the circuit to rectifier 103, the circuit therefrom to bias tube 106, the time delay constants 105, 107, solenoid 109 and the relays actuated thereby) which is adapted to condition the recording and play-back means for operation and to condition the hand set for operation. The operation of this means is initiated by reception of the bell sound and as hereafter described, retains the apparatus in condition for its various operations as long as sound frequencies are received either from the telephone line or the record play-back means.

The result of the ringing of the bell signal is therefore that the phonograph motor is turned on, the play-back arm 21 and cutter arm 43 are lowered into contact with the record, the input of amplifier 98 is switched to the phonograph pick-up in arm 21, and the output of the amplifier connected with the telephone receiver and the telephone set lifted for operation.

Solenoid 109 is maintained energized after the currents derived from the ringing of the bell have stopped due to the charging capacity of the time circuit, which includes resister 105 and condenser 107. In order for the bias which has been imposed upon tube 106 to be discharged, this bias must be bled off from not only resister 105, but resister 104, the values of which are selected so as to allow a suitable time period of operation, such as, for example, twelve seconds. This will not occur as long as any sound frequencies are being passed from the amplifier 98. At this period of operation the announcement message recorded on the disk now is taken through the amplifier 98 to the receiver 14 of the telephone unit, from which it is picked up by the microphone of the telephone in set 5 and transmitted to the party calling. Simultaneously, a portion of the energy is taken through the filter circuits to tube 106 to maintain this tube positively biased so that it will continue to hold solenoid 109 energized.

When the announcement period has been completed the arm 21 closes contacts 40 previously described. The closing of these contacts connects the ground line 111 to line 131, which leads to contacts 115 of the relay including solenoid 112. This contact is now connected by arm 114 to line 131 leading to solenoid 77. Solenoid 77 is thereby energized. Energizing solenoid 77 by making contact between arm 79 and 82 establishes a holding circuit to retain solenoid 77 energized, even when contacts 40 are open. The arm 78, by transferring line 86 from contact 76 to contact 81, transfers the input of amplifier 98 to line 133 leading to a tap of potentiometer 72, thereby cutting out condenser 73 and allowing the amplifier to respond to the full audio frequency range. Switch arm 79, by moving upwardly, breaks the circuit which has been energizing the solenoid 88 and the solenoid 33. The reproducing arm 21 is thus lifted from the record and returned to its original position. The deenergizing of solenoid 88 by moving its switch arm 89 transfers the input of amplifier 98 from the phonograph arm 21 to the preamplifier through the previously described circuit. Simultaneously, the switch arm 90 transfers the output of the amplifier 98 from line 128 to line 134 leading to the head in the recording arm 43. By this operation, therefore, the apparatus has been conditioned so that any message sent by the person making the call will be picked up, passed through the amplifier to the recording head and recorded on the disk record. As long as such sound signals are being received bias is continued to be supplied to tube 106 to hold solenoid 109 energized. At the end of the message, after a considerable silent period, such as twelve seconds, the bias on tube 106 will be sufficiently beld off so that tube 106 will no longer energize solenoid 109, which thereby opens its contact 110 restoring the apparatus to its original position, except that the recording arm 43 maintains its position radially with respect to the record, but is lifted from the record so that on subsequent operation it will record on a fresh portion of the record.

The apparatus also includes a device by which it is possible to have the messages which have been recorded by the apparatus from previous telephone calls played back over the telephone line. It is desirable, of course, that only the owner of the apparatus should be able to have these messages repeated to him, but when the owner of the apparatus is away from his office, with the apparatus of the present invention he may call his office and have the automatic apparatus play the messages to him. For this purpose the owner is provided with a suitable device (not shown) for producing a combination of sustained audio tones, which by combining together will produce a frequency corresponding to that to which the filter circuit, including condenser 101, reaction 102 and resister 100, is tuned. Such an apparatus may consist, for example, simply of a whistle having two reeds therein giving sustained audio tones of three thousand and four thousand cycles so as to combine, as hereafter described, to produce in the apparatus a seven thousand cycle note. Such a seven thousand cycle note will generally be beyond the frequency of response of the telephone lines, but where it is not, a higher frequency may be selected for the operation.

When the owner of the apparatus desires the messages repeated to him he calls his office in the usual manner, whereupon the apparatus proceeds to operate as previously described up until the announcement period has been completed and the apparatus shifted over to recording position. Thereupon the owner sounds through the telephone line the two sustained tones described. These tones are amplified and passed through the amplifier 98 to the filter circuit. By overloading amplifier 98 a non-linear condition arises which causes the production of the desired high frequency signal. Since the filter is tuned to this signal an increased current is drawn from rectifier 103. This signal is applied to condenser 141 and tube 142. The resister 140 and condenser 141 constitute an additional time delay charging circuit with the result that tube 142 becomes biased positively.

Tube 142 is normally biased by its cathode resister 143*a* so as to draw very little current and the resister 140 prevents the normal audio frequencies from biasing tube 142 to the point where it will undergo substantial operation. When, however, the frequency to which the filter is tuned is developed in the apparatus, as described, sufficient current is passed to bias tube 142 so that it draws substantial current to a solenoid 143 so as to actuate that solenoid. Solenoid 143 closes its contact 144; this connects the negative line 111 to a line 145 and thus energizes relay 112.

The movement of arm 113 breaks the circuit to the solenoid 59 so that the recording arm 43 is lifted. The movement of arm 114 to make contact with contact 117 deenergizes relay 77. This relay dropping out through the circuit previously described energizes relay 88 and by the method previously described connects the play-back arm 21 in position to play the recorded messages to the amplifier and from the amplifier to the speaker 14. Simultaneously, a positive bias is applied to tube 142 as follows: The movement of arm 114 to make contact with contact 117 connects the 24 volt D. C. potential through coil of relay 77 through a resister 146 to line 147. This positive bias is sufficient to cause tube 142 to hold solenoid 143 energized. The apparatus is thus retained in the play-back position until all of the messages have been played back, whereupon the play-back arm is shifted rapidly to the end of the record, aided in this case by the action of spring 38 causing the closing of contacts 42. This switch, by connecting line 148 to a line 147 grounds that line to prevent the biasing of tube 106 or tube 142, so that both relays 109 and 143 are deenergized and the apparatus is restored to its initial position.

While the particular example of the present invention herein described is well adapted to carry out the objects of the invention, various changes and modifications may be made, and this invention is of the scope set forth in the appended claims.

I claim:

1. A telephone-answering apparatus comprising a sound-recording and play-back means, a telephone unit having means for moving a hand set of a telephone line to and from an operative position and a microphone and receiver for respectively transmitting sound from the hand set to the telephone unit and from the telephone unit to the hand set, and a conditioning means for conditioning said recording and play-back means and said hand set for operation, said conditioning means including means for initiating its action by the reception of sound from said hand set and including retaining means for retaining the same in operative position by the continuation of the reception of sound frequencies from either said recording and play-back means or telephone unit, said latter means including a time delay circuit.

2. A telephone-answering apparatus having in combination with means for recording and playing back sound, means for transmitting sound to and from said recording and play-back means and from and to a hand set of the telephone line, means for simultaneously conditioning said recording and play-back means and hand set of a telephone line in operative condition, said means including a member brought into operative condition by the imposition of a bias thereon and means for biasing said member by sound frequencies received from either said recording and play-back means or said transition means, said member being actuated to the inoperative condition by the removal of said bias, and a time delay circuit in said bias supplying means to delay the operation of the conditioning means.

3. A telephone-answering apparatus comprising the combination of means for recording and playing back sound and means for transmitting sound from and to said recording and play-back means and to and from a hand set of a telephone line, of means for conditioning said recording and play-back means for operation including a solenoid, a circuit for energizing said solenoid including a tube normally biased to an inoperative condition and a biasing circuit for said tube responsive to the reception of audio frequency from either said hand set or said recording and play-back means.

4. A telephone-answering apparatus comprising the combination of means for recording and playing back sound and means for transmitting sound from and to said recording and play-back means and to and from a hand set of a telephone line, of means for conditioning said recording and play-back means for operation including a solenoid, a circuit for energizing said solenoid including a tube normally biased to an inoperative condition and a biasing circuit for said tube responsive to the reception of audio frequency from either said hand set or said recording and play-back means, said conditioning means being operative to also condition said hand set for operation.

5. A telephone-answering apparatus comprising the combination of means for recording and playing back sound and means for transmitting sound from and to said recording and play-back means to and from a hand set of a telephone line, of means for conditioning said recording and play-back means for operation including a solenoid, a circuit for energizing said solenoid, including a tube normally biased to an inoperative condition and a biasing circuit for said tube responsive to the reception of audio frequency from either said hand set or said recording and play-back means, said biasing means including a time delay circuit for retaining the bias for a time delay period after the discontinuation of the reception of said sound frequencies.

6. A telephone-answering apparatus comprising the combination of means for recording and playing back sound and means for transmitting sound from and to said recording and play back means to and from a hand set of a telephone line, of means for conditioning said recording and play back means for operation including a solenoid, a circuit for energizing said solenoid including a tube normally biased to an inoperative condition and a biasing circuit for said tube responsive to the reception of audio frequency from either said hand set or said recording and play back means, said biasing means including a time delay circuit adapted to retain the bias for a time delay period after discontinuation of said sound frequencies, and said conditioning means being operative for also conditioning said hand set for operation.

7. A telephone-answering apparatus comprising the combination with means for recording and playing back sound and means for transmitting sound to and from said recording and play back means from and to a hand set of a telephone line, means for conditioning and retaining the recording and play back means in operation, said conditioning means being responsive to the reception of sound from said hand set or said recording and play back means and including time delay means for holding it in operative condition for a time delay period at the discontinuation of the reception of said sound, and a circuit for initiating the action of said conditioning means including means for suppressing the lower sound frequencies.

8. A telephone-answering apparatus comprising the combination with means for recording and playing back sound and means for transmitting sound from and to said first mentioned means and to and from a hand set of a telephone line, of a conditioning means for conditioning and retaining said recording and play back means for operation, said conditioning means being actuated by reception of sound frequency from either said hand set or recording and play back means, said conditioning means being operative normally to cause said recording and play back means to record messages, said conditioning means also including means tuned to a frequency outside of the normal audio range of the telephone lines and non-linear means for producing such a frequency from specific combinations of audio tones, said conditioning means being responsive to the production of such frequency for actuating said recording and playback means to the play-back position.

9. A telephone-answering apparatus comprising the combination with means for recording and playing back sound and means for transmitting sound from and to said means and to and from a hand set of a telephone line, of means for conditioning said recording and play-back means for recording messages from said telephone lines, and means for conditioning said recording and play-back means to play back to the telephone lines previously recorded messages, said latter means including a circuit tuned to resonance to a frequency outside of the audio range of the telephone lines and non-linear circuit for producing such a frequency by the reception of specific combinations of audio frequency within the range of the telephone lines.

10. A telephone-answering apparatus comprising the combination with means for recording and playing back sound and means for transmitting sound from and to said means and to and from a hand set of the telephone line, of a conditioning means for conditioning said recording and play-back means for recording sound including a solenoid energized by current from a thermionic tube, a biasing circuit for said thermionic tube adapted to bias said tube for operation by the reception of sound from either said hand set or said recording and play-back means, and a second solenoid for conditioning said recording and play-back means to play back recorded messages, said latter solenoid being energized by a thermionic tube, biasing means for said thermionic tube including a circuit tuned to a specific frequency so that said biasing means is responsive only to the reception of said frequency for operation.

11. A telephone-answering apparatus comprising the combination with means for recording and playing back sound and means for transmitting the sound from and to said means and to and from a hand set of the telephone line, of conditioning means for conditioning said recording and play-back means for recording sound including a solenoid energized by current from a thermionic tube, a biasing circuit for said thermionic tube adapted to bias said tube for operation by the reception of sound from either said hand set or said recording and play-back means, said recording and play-back means to play back recorded messages, said latter solenoid being energized by a thermionic tube, biasing means for said thermionic tube including a circuit tuned to a specific frequency so that said biasing means is responsive only to the reception of said frequency for operation, said frequency being outside of the frequency of response of the telephone lines, the conditioning means including a non-linear element for producing such a frequency from specific sound frequencies.

12. A telephone-answering apparatus comprising a microphone for receiving sounds from a telephone hand set, a receiver for transmitting sounds to the hand set, a sound recording member, a sound play-back member, an amplifier having means for shifting its input from said microphone to said play-back member, and means for shifting its output from said receiver to said recorder having an outlet also to conditioning means, said conditioning means being responsive to the reception of sound frequencies from said amplifier and including a time delay element to delay the discontinuance of its response after the reception of sound frequencies from said amplifier, the input of the amplifier being connected to said microphone before response of said conditioning means, said conditioning means being operative for first shifting the amplifier input to said play-back means and to connect the output to said receiver and to retain the apparatus in operative condition until the time period after the reception of sound frequencies, the play-back means including a control member for shifting the input of the amplifier to the microphone after initial period and to simultaneously shift the output of the amplifier to the recording means, said means being under control of said conditioning means, said conditioning means including a filter circuit responsive to frequency outside of that received from the amplifier for placing in inoperative condition the means actuated by said play-back means for effecting such shifting of the amplifier, the conditioning means including a non-linear circuit for generating said frequency.

13. A sound-recording and play-back apparatus comprising a play-back means for generating sound frequencies from a record, said means including and arm movable over a record, a stop for stopping the movement of the arm at the edge of said record, a pivoted slide member movable into contact with said arm for lifting said arm from the record and sliding the same against said stop, a solenoid for moving said slide, and means for energizing said solenoid, said means including means responsive to and retained in operation by the reception of sound frequencies.

14. A sound-recording and play-back apparatus comprising a play-back means for generating sound frequencies from a record, said means including an arm movable over a record, a stop for stopping the movement of the arm at the edge of said record, a pivoted slide member movable into contact with said arm for lifting said arm from the record and sliding the same against said stop, a solenoid for moving said slide, and means for energizing said solenoid, said means including means responsive to and retained in operation by the reception of sound frequencies, said means including a time delay element.

15. In an apparatus of the class described a combination with a record moving member of an arm including a play-back means for producing audio frequencies from a record on said member, said arm being movable over said record, a stop for limiting the movement of the arm at the commencement of said record, a movable shift member for lifting said arm and shifting the same against said stop, a solenoid for actuating said member, a recording arm movable over said record including recording means for recording sound frequencies on said record, means for lifting and slightly advancing said recording arm including a solenoid, said solenoid being under control of a conditioning means, said conditioning means being actuated and retained in operation by sound frequencies.

16. A telephone-answering apparatus comprising means for recording and playing back sound and means for transmitting sound from and to said means and to and from a hand set of the telephone line, of means for conditioning said recording and play-back means for operation initiated and retained in operation by the reception of sound from either said recording and play-back means or said transmission means and including a time delay period for retaining the conditioning means actuated for a time period after the discontinuance of the reception of said sound frequencies, said means for recording of the play-back sound including an arm movable over a record and containing a play-back head, a stop for limiting the movement of said arm, a movable slide for lifting said arm and sliding the same against said stop, a solenoid for moving said slide, a second arm movable over said record including a recording head means for lifting and slightly advancing the second arm, including a second solenoid, said conditioning means being adapted to condition both solenoids for operation, the second solenoid being initiated for operation on the energization of said conditioning means and a switch actuated by the recorder arm for initiating the action of said first solenoid after a limited movement of said arm.

17. A telephone answering apparatus comprising the combination of means for recording and playing back sound and means for transmitting sound from and to said recording and play-back means and to and from a telephone line, of means for conditioning said recording and play-back means for operation including a solenoid, a circuit for energizing said solenoid including a tube normally biased to an inoperative condition, and a bias in circuit for said tube responsive to the reception of audio frequency from either said telephone line or said recording and play-back means.

18. A telephone answering apparatus comprising the combination of means for recording and playing back sound and means for transmitting sound from and to said recording and play-back means and to and from a telephone line, of means for conditioning said recording and play-back means for operation including a solenoid, a circuit for energizing said solenoid including a tube normally biased to an inoperative condition, and a bias in circuit for said tube responsive to the receipt of audio frequency from either said telephone line or said recording and play-back means, said bias circuit including a time delay circuit for retaining the bias for a time delayed period after the discontinuance of the reception of said sound frequencies.

19. A telephone answering apparatus comprising the combination of a means for recording and playing back sound and means for transmitting sound from and to said first mentioned means and to and from a telephone line, of a conditioning means for conditioning and retaining the recording and play-back means for operation, said conditioning means being retained in operation by the reception of sound frequency from either the telephone lines or said recording and play-back means, said conditioning means being operated normally to cause said recording and play-back means to record message, said conditioning means also including means tuned to a predetermined frequency for operation in response to the reception of said frequency for actuating said recording and play-back means to the play-back position.

20. A telephone answering apparatus comprising the combination with means for recording and playing back sound and means for transmitting sound from and to said means and to and from telephone lines, of a conditioning means for conditioning said recording and play-back means for recording sound including a solenoid energized by current from a thermionic tube, a biasing circuit for said thermionic tube adapted to bias said tube for operation by the reception of sound either from the telephone line or said recording and play-back means; and a second solenoid for conditioning said recording and play-back means to play back recorded messages, said latter solenoid being energized by a thermionic tube, bias means for said thermionic tube including a circuit tuned to a specific frequency so that said biasing means is responsive only to the reception of said frequency for operation.

WILLIAM C. EDWARDS.

REFERENCES CITED

The following references are of record in the file of this patent:

UNITED STATES PATENTS

| Number | Name | Date |
|---|---|---|
| 1,973,081 | Keiser | Sept. 11, 1934 |
| 2,005,788 | Keiser | June 25, 1935 |
| 2,093,675 | Henderson | Sept. 21, 1937 |
| 2,261,420 | Shively et al. | Nov. 4, 1941 |